(12) United States Patent
Romig et al.

(10) Patent No.: US 7,093,876 B2
(45) Date of Patent: Aug. 22, 2006

(54) TAILGATE LIFT-ASSIST ASSEMBLY

(75) Inventors: Joel Romig, Plain City, OH (US); Danny Cheung, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 10/989,695

(22) Filed: Nov. 16, 2004

(65) Prior Publication Data

US 2005/0285425 A1    Dec. 29, 2005

Related U.S. Application Data

(60) Provisional application No. 60/583,660, filed on Jun. 29, 2004.

(51) Int. Cl.
 *B60P 1/267* (2006.01)
(52) U.S. Cl. ............................ 296/50; 296/57.1; 296/61
(58) Field of Classification Search ................. 296/50, 296/57.1, 61; 49/386, 340, 28
See application file for complete search history.

(56) References Cited

U.S. PATENT DOCUMENTS

| | | | | |
|---|---|---|---|---|
| 1,357,655 A | * | 11/1920 | Sandell | 217/60 C |
| 3,572,837 A | * | 3/1971 | Lackey | 298/23 S |
| 3,885,686 A | * | 5/1975 | Siebring | 414/549 |
| 4,289,214 A | * | 9/1981 | Spence | 180/234 |
| 5,271,652 A | | 12/1993 | Watanabe et al. | |
| 5,358,301 A | | 10/1994 | Konchan et al. | |
| D370,453 S | * | 6/1996 | Shortman et al. | D12/223 |
| 5,645,310 A | * | 7/1997 | McLaughlin | 296/57.1 |
| 5,954,383 A | | 9/1999 | Beck et al. | |
| 5,988,724 A | | 11/1999 | Wolda | |
| 6,126,223 A | * | 10/2000 | Rayburn | 296/57.1 |
| 6,135,532 A | * | 10/2000 | Martin | 296/61 |
| 6,206,444 B1 | * | 3/2001 | Casey | 296/50 |
| 6,247,885 B1 | * | 6/2001 | Smart | 414/111 |
| 6,272,775 B1 | * | 8/2001 | Schmidt et al. | 37/399 |
| 6,330,903 B1 | * | 12/2001 | Weinreich | 160/295 |
| 6,367,864 B1 | * | 4/2002 | Rogers et al. | 296/57.1 |
| 6,485,004 B1 | * | 11/2002 | Licata et al. | 296/50 |
| 6,550,836 B1 | * | 4/2003 | Rigau | 296/37.6 |
| 6,550,840 B1 | * | 4/2003 | Rayburn | 296/57.1 |
| 6,764,130 B1 | | 7/2004 | Hull | |
| 6,779,825 B1 | | 8/2004 | Greenert et al. | |
| 6,964,445 B1 | * | 11/2005 | Bellis, Jr. | 296/57.1 |
| 6,994,390 B1 | * | 2/2006 | Zagoroff | 296/57.1 |
| 7,000,908 B1 | * | 2/2006 | Costello et al. | 267/74 |
| 2003/0122396 A1 | | 7/2003 | Humphrey et al. | |

FOREIGN PATENT DOCUMENTS

| EP | 1 428 709 A2 | 6/2004 |
|---|---|---|
| JP | 4-38888 | 4/1992 |

* cited by examiner

*Primary Examiner*—Kiran B. Patel
(74) *Attorney, Agent, or Firm*—Fay, Sharpe, Fagan, Minnich & McKee, LLP

(57) ABSTRACT

A tailgate lift-assist assembly is provided for a tailgate mounted to a vehicle body. The tailgate is movable between a closed position and an open position. The tailgate lift-assist assembly includes a spring having a first spring end and a second spring end. The spring is attached to the tailgate at the first spring end. A stationary member is rotatably connected to the tailgate and nonrotatably connected to the vehicle body. A cable has a first cable end and a second cable end. The cable is attached to the spring second end at the first cable end and attached to the stationary member at a cable second end. The cable passes over a pulley that is rotatably mounted to the tailgate and applies a tension on the spring when the tailgate is moved toward the open position.

28 Claims, 12 Drawing Sheets

TAILGATE LIFT-ASSIST ASSEMBLY

This application claims priority of Provisional Patent Application Ser. No. 60/583,660, filed Jun. 29, 2004, entitled "Tailgate Lift-Assist Assembly".

BACKGROUND

The present invention relates to tailgates and, more particularly, to a tailgate lift-assist assembly. In one embodiment, the tailgate lift assist system is provided for use in conjunction with a dual-mode tailgate and will be described with particular reference thereto. It is to be appreciated, however, that the invention may relate to other similar environments and applications.

It is known to use a spring, such as a torsion spring, with a tailgate to decrease the perceived weight of the tailgate when a user is opening the tailgate or attempting to close the tailgate. Typically, the spring is loaded to an increasing degree as the tailgate is moved from a closed position toward an open position. Such loading assists the user in moving the tailgate to the open position. More specifically, the weight of the tailgate is resisted by the loaded spring so the tailgate does not feel too heavy to the user. If the weight of the tailgate were not countered by the force of the loaded spring, the tailgate could end up falling or dropping to the open position immediately upon moving the tailgate from the closed position.

The gradient loading of the spring as the tailgate is moved toward the open position also assists the user when closing the tailgate. More particularly, the loaded spring counters the weight of the tailgate so the tailgate is moveable by the user from the open position toward the closed position with relative ease. Without the spring, the weight of the tailgate could be too much for some users and/or may cause difficulties for other users in closing the tailgate.

Prior art lift-assist assemblies are often overly complex and/or require too many components resulting in increased costs associated with the manufacture and assembly of these lift-assist assemblies. Moreover, prior art lift-assist assemblies are generally unsuitable for use with dual-mode tailgates. Specifically, prior art lift-assist assemblies typically extend between the tailgate and sidewalls of a bed to which the tailgate is mounted. Thus, while the lift-assist assembly allows the tailgate to pivot to a fold-open position, the tailgate is unable to pivot open along a vertical axis toward a swing-open position.

BRIEF SUMMARY

In accordance with one aspect, a tailgate lift-assist assembly is provided for a tailgate mounted to a vehicle body. The tailgate is movable between a closed position and an open position. More particularly, in accordance with this aspect, the tailgate lift-assist assembly includes a spring having a first spring end and a second spring end. The spring is attached to the tailgate at the first spring end. A stationary member is rotatably connected to the tailgate and nonrotatably connected to the vehicle body. A cable has a first cable end and a second cable end. The cable is attached to the spring second end at the first cable end and attached to the stationary member at a cable second end. The cable passes over a pulley that is rotatably mounted to the tailgate and applies a tension on the spring when the tailgate is moved toward the open position.

In accordance with another aspect, a load-assisting assembly is provided. More particularly, in accordance with this aspect, the load-assisting assembly includes a spring having a first spring end attached to an associated tailgate. A stationary member is rotatably connected to the associated tailgate and nonrotatably connected to an associated vehicle body onto which the tailgate is mounted. A cable has a first cable end attached to a second spring end of the spring and a second cable end attached to the stationary member. A pulley is rotatably mounted to the associated tailgate and carries the cable. The cable applies a tension to the spring when the associated tailgate is moved relative to the associated body and the pulley increases the amount of the tension when the tailgate is moved.

In accordance with yet another aspect, a load-assisting assembly is provided for assisting with movement of a first body relative to a second body. More particularly, the load-assisting assembly includes a spring having a spring first end connected to the first body. A stationary member is rotatably connected to the first body and nonrotatably connected to the second body. A cable has a first cable end connected to a spring second end of the spring and a second cable end connected to the stationary member. The cable passes over a pulley rotatably mounted to the first body and applies a tension to the spring when the first body is moved in a first direction relative to the second body for assisting in movement of the first body in a second, opposite direction relative to the second body.

In accordance with still another aspect, a tailgate lift-assist assembly is provided. More particularly, in accordance with this aspect, a stationary member is rotatably connected to a tailgate that is mounted to a vehicle body. A cable has a first cable end connected to the tailgate and a second cable end connected to the stationary member. A spring is disposed one of along the cable, adjacent the first cable end and adjacent the second cable end. The spring is tensioned when the tailgate is moved from a closed position toward an open position and thereby applies a closing force to the tailgate through the cable when the tailgate is moved between the closed position and the open position.

In accordance with still yet another aspect, a tailgate lift-assist assembly is provided. More particularly, in accordance with this aspect of the invention, the tailgate lift-assist assembly includes a spring having a first spring end attached to a tailgate and a second spring end. A cable has a first cable end connected to the second spring end and a second cable end removably connected to a vehicle body to which the tailgate is mounted. The spring is tensioned when the tailgate is moved from a closed position toward an open position to thereby apply a closing force to the tailgate through the cable when the tailgate is moved between the closed position and the open position.

BRIEF DESCRIPTION OF THE DRAWINGS

The one or more embodiments may take form in various components and arrangements of components, and in various steps and arrangements of steps. The drawings are only for purposes of illustrating the one or more preferred embodiments and are not to be construed as limiting the invention.

DETAILED DESCRIPTION

Figure 1:
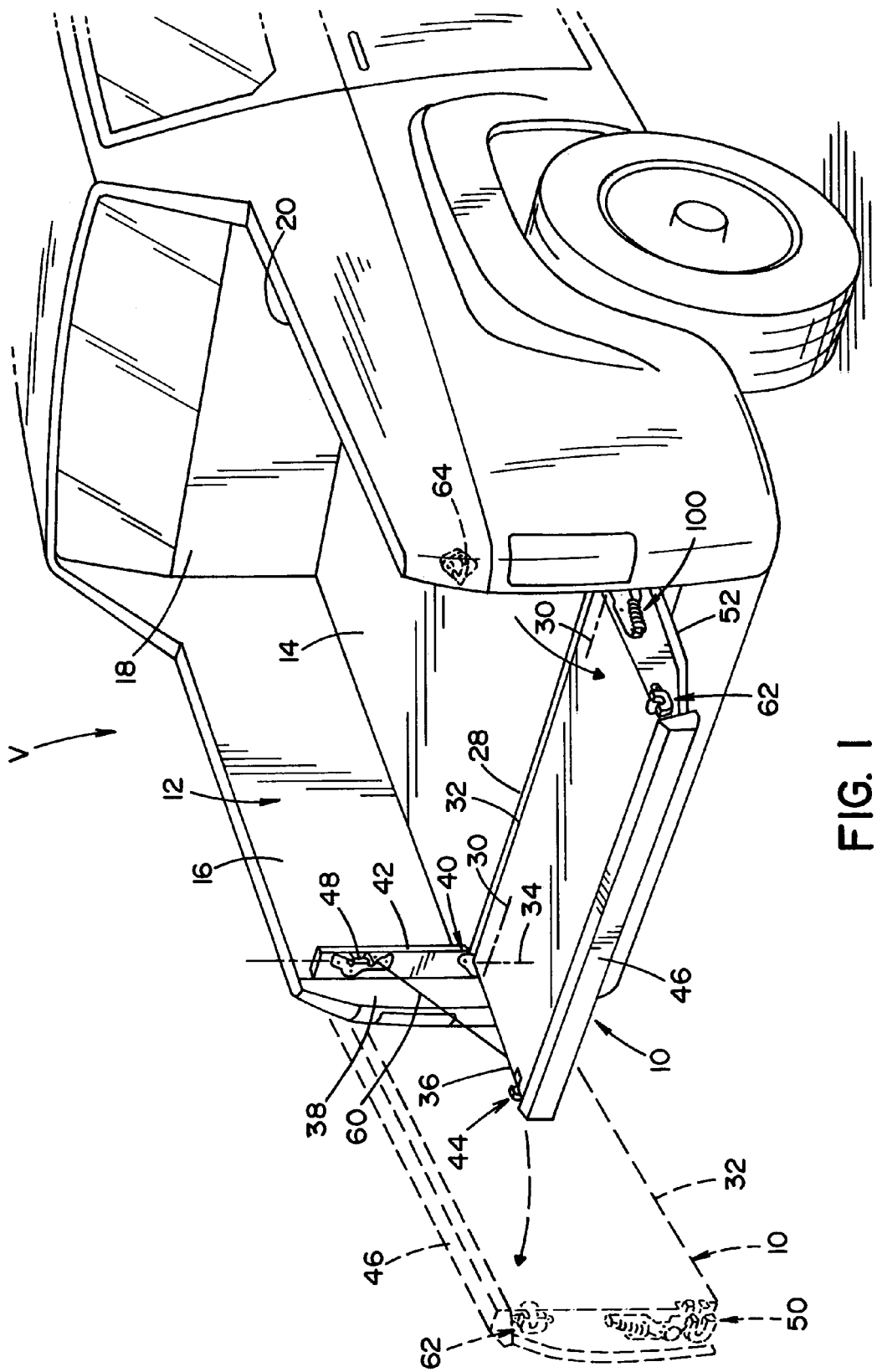
FIG. 1 is a perspective view of a dual-mode tailgate on a vehicle openable in (1) a first, fold-down direction and (2) a second, side-to-side direction.

Referring now to the drawings wherein the showings are for purposes of illustrating one or more embodiments only and not for purposes of limiting the same, with specific reference to FIG. 1, a closure structure or assembly, such as dual-mode tailgate 10, is shown as a component of a load-carrying bed 12 of a vehicle V. In the illustrated embodiment, the vehicle V is a sport utility truck, but it is to be appreciated by those skilled in the art that the vehicle V could be any other type of vehicle having a tailgate or closure structure, such as a pickup truck, utility truck or other vehicle. Generally, the bed 12 includes a bed floor 14 having a plurality of walls 16,18,20 extending upwardly adjacent three edges and forming a portion of a vehicle body of the vehicle V.

The dual-mode or dual-axis tailgate 10 is positioned along an open, rear edge 28 of the bed floor 14. More particularly, the tailgate 10 extends between the first and second sidewalls 16,20 to selectively close an open end of the load-carrying bed 12. The tailgate 10 is mounted to the vehicle V and is able to pivot about a first axis 30 (FIG. 2) for movement between a closed position and a fold-open position. In the illustrated embodiment, the first axis 30 is generally horizontal and parallel with the rear edge 28 of the bed floor 14 which defines the opening in which the tailgate is disposed. The tailgate 10 is also alternatively able to pivot about a second axis 34 (FIG. 2) for movement between the closed position and a swing-open position. In the illustrated embodiment, the second axis 34 is generally vertical and parallel with a first side wall end 38 which also defines the opening in which the tailgate is disposed. The second axis 34 is generally normal relative to the first axis 30.

Figure 2:
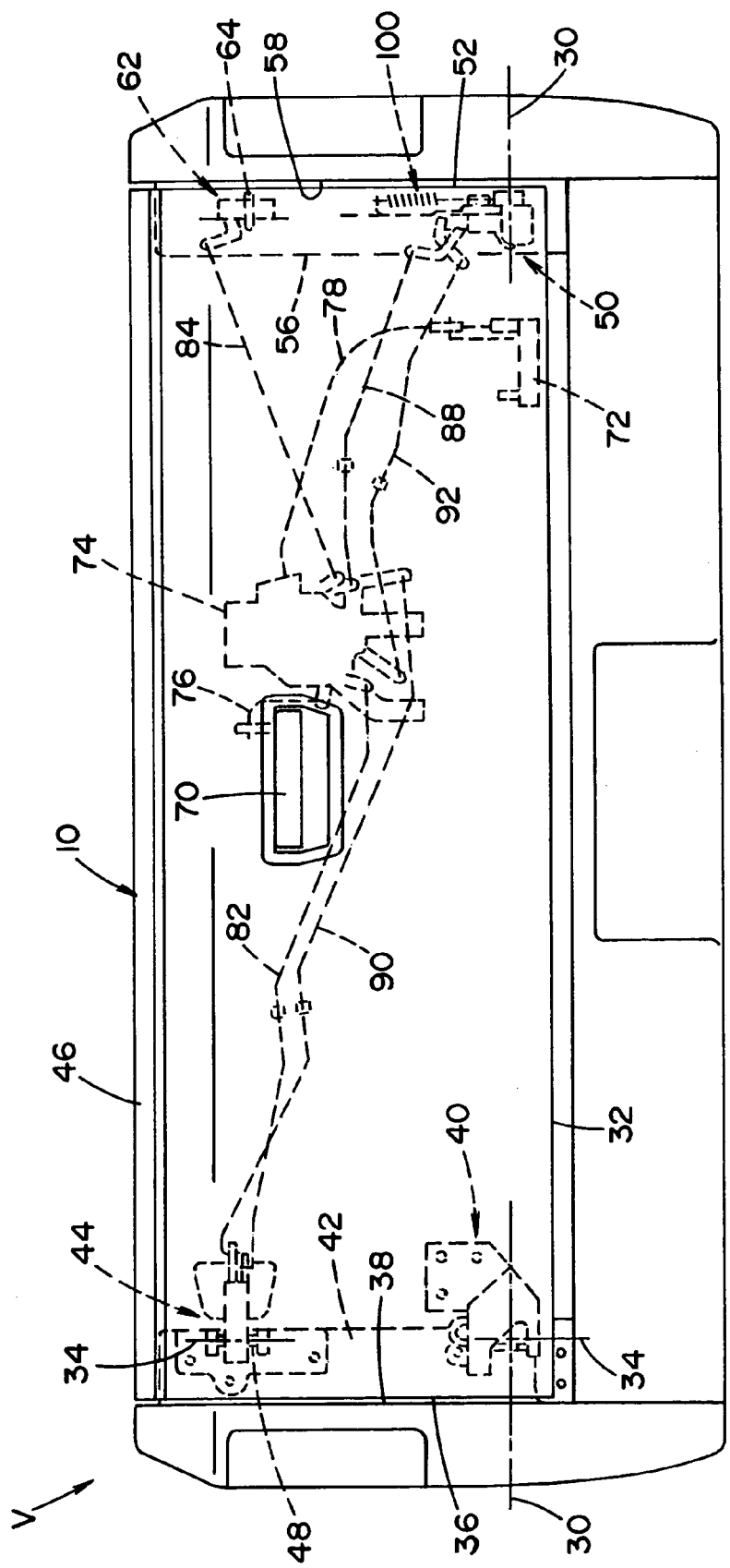
FIG. 2 is a rear elevational view of the tailgate on the vehicle showing a tailgate control system and a tailgate lift-assist assembly (both in hidden lines).

To facilitate the dual-mode action of the tailgate 10, with additional reference to FIG. 2, a dual-mode hinge assembly 40 attaches or is mounted to the tailgate 10 at or adjacent a first corner of the tailgate formed at the intersection of a bottom edge 32 and a first lateral edge 36 of the tailgate 10 (lower left corner of FIG. 2). The dual-mode hinge assembly 40 pivotally connects the tailgate 10, along the first and second axes 30,34, to the vehicle V. More specifically, the dual-mode hinge assembly 40 pivotally connects to a flange or pillar 42 extending from and connected to the first side wall end 38 adjacent the rear edge 28 of the bed floor 14 for movement about the first axis 30 and alternative movement about the second axis 34. In one embodiment, the dual-mode hinge assembly is the same or similar to that described in commonly owned, U.S. patent application Ser. No. 10/663,581, entitled "Tailgate Dual Mode Hinge With Integrated Checker" and filed on Sep. 16, 2003, expressly incorporated herein by reference.

A first hinge/lock assembly 44 attaches or is mounted to the tailgate 10 spaced from the hinge assembly 40 in a first direction. More specifically, the hinge/lock assembly 44 is mounted at or adjacent a second corner of the tailgate formed at the intersection of the first lateral edge 36 and a top edge 46 of the tailgate 10 (upper left corner in FIG. 2). The first hinge/lock assembly 44 selectively latches or locks to a first hinge/lock striker 48 to releasably lock the tailgate 10 to the vehicle V. The first hinge/lock striker 48 is mounted to the pillar 42 above the hinge assembly 40. When operating as a hinge, the first hinge/lock assembly 44 cooperates with the hinge assembly 40 to pivotally support the tailgate 10 along or about the second axis 34 and allows the tailgate to move between the tailgate closed position and the swing-open position.

A second hinge/lock assembly 50 attaches or is mounted to the tailgate 10 spaced from the hinge assembly 40 in a second direction. More specifically, the hinge/lock assembly 50 is mounted at or adjacent a third corner of the tailgate formed at the intersection of the bottom edge 32 and a second lateral edge 52 of the tailgate (lower right corner in FIG. 2). The second hinge/lock assembly 50 selectively latches or locks to a second hinge/lock striker 54 (FIG. 15) to releasably lock the tailgate 10 to the vehicle V. The striker 54 is mounted to a flange or pillar 56 extending from and connected to a second wall end 58 adjacent the rear edge 28 of the bed floor 14. The second hinge/lock assembly 50 cooperates with the hinge assembly 40 to pivotally support the tailgate 10 along or about the first axis 30 and allows the tailgate to move between the tailgate closed position and the fold-open or flip-down position. A support cable 60 is optionally provided for supporting the tailgate 10 in the flip-down position. The support cable 60 connects to the flange 42 adjacent the first striker 48 and to the first lateral edge 36.

A locking assembly 62 attaches or is mounted to the tailgate at or adjacent a fourth corner of the tailgate formed at an intersection of the top edge 46 and the second lateral edge 52 of the tailgate (upper right corner in FIG. 2). The locking assembly 62 selectively latches to a locking striker 64 to releasably lock the tailgate to the vehicle V. The striker 64 is mounted to the flange 56 above the second hinge lock striker 54. The tailgate 10 is openable toward or to the fold-open position about the axis 30 when both the first hinge/lock assembly 44 is unlatched from the first hinge/lock striker 48 and the locking assembly 62 is unlatched from the locking striker 64. The tailgate 10 is openable toward or to the swing-open position about the axis 34 when both the second hinge/lock assembly 50 is unlatched from the second hinge/lock striker and the locking assembly 62 is unlatched from the locking striker 64.

The tailgate 10 additionally includes a first or upper handle assembly 70 and a second or lower handle assembly 72. The first or upper handle assembly 70 is centrally mounted to the tailgate 10 for opening thereof in the flip-down mode. The second or lower handle assembly 72 is mounted adjacent the bottom edge 32 of the tailgate 10 for opening thereof in the swing-open mode. A tailgate synchronizer 74 is mounted within the tailgate 10 for mechanically communicating and coordinating operation between the handle assemblies 70,72, the first and second hinge/lock assemblies 44,50 and the locking assembly 62. The synchronizer 74 functions without the use of electrical power enabling the tailgate 10 to be operational even when electrical power is unavailable, such as might occur as the result of a dead battery.

More specifically, the upper handle assembly 70 communicates with the synchronizer 74 through a rod 76 and the lower handle assembly 72 communicates with the synchronizer through a cable 78. The synchronizer 74 selectively allows the handle assembly 70 to unlock the hinge/lock and locking assemblies 44,62 from their respective strikers 48,64 when the upper handle assembly is actuated via rods 82,84. The synchronizer 74 also selectively allows the lower handle assembly 72 to unlock the hinge/lock and locking assemblies 50,62 from their respective strikers 54,64 when the lower handle assembly is actuated via the rod 84 and an actuator rod 88.

To prevent damage to the vehicle V and/or the tailgate 10, as well as potential injury to a user of the tailgate, the tailgate is prevented from operating in both of its modes (swing-open and fold-down) simultaneously. If tailgate 10 was able to open in both modes simultaneously, the tailgate would only be connected to the vehicle V by the hinge assembly 40, as all three lock assemblies 44,50,62 would be unlocked. For this purpose, the synchronizer 74 additionally communicates with the first and second hinge/lock assemblies 44,50 through sensor rods 90,92. Based on the communications received from the rods 90,92, the synchronizer 74 selectively enables communication between the handle assemblies 70,72 and each of the first hinge/lock assembly 44, the second hinge/lock assembly 50, and the locking assembly 62. The operation of the tailgate 10 is not described in further detail herein but, in one embodiment, can be the system for operating and controlling a tailgate that is described in commonly owned, U.S. patent application Ser. No. 10/894,951 entitled "Dual Mode Tailgate Control System" and filed on Jul. 20, 2004, expressly incorporated herein by reference.

Figure 3:
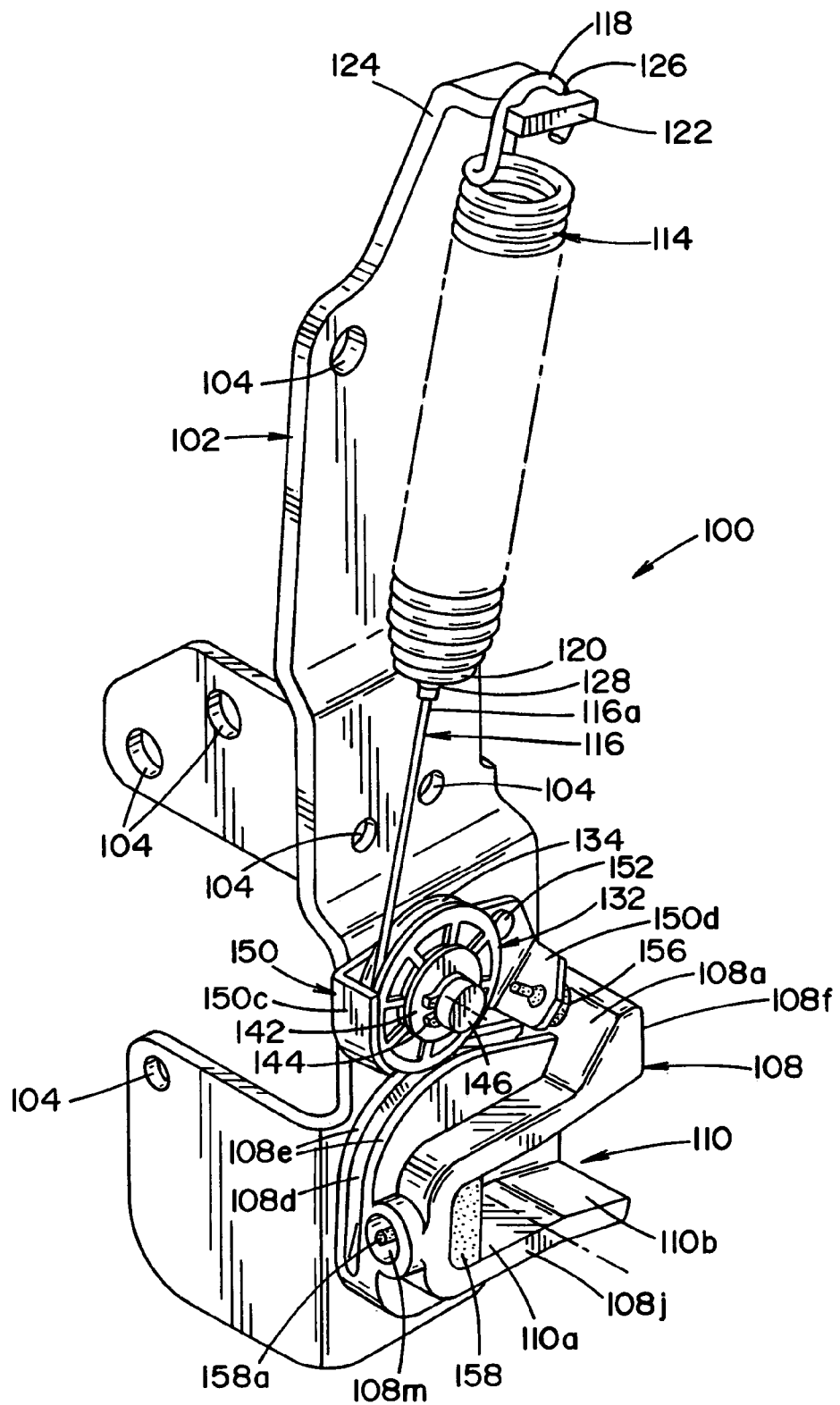
FIG. 3 is a perspective view of the tailgate lift-assist assembly of FIG. 2 shown removed from the tailgate.
Figure 4:
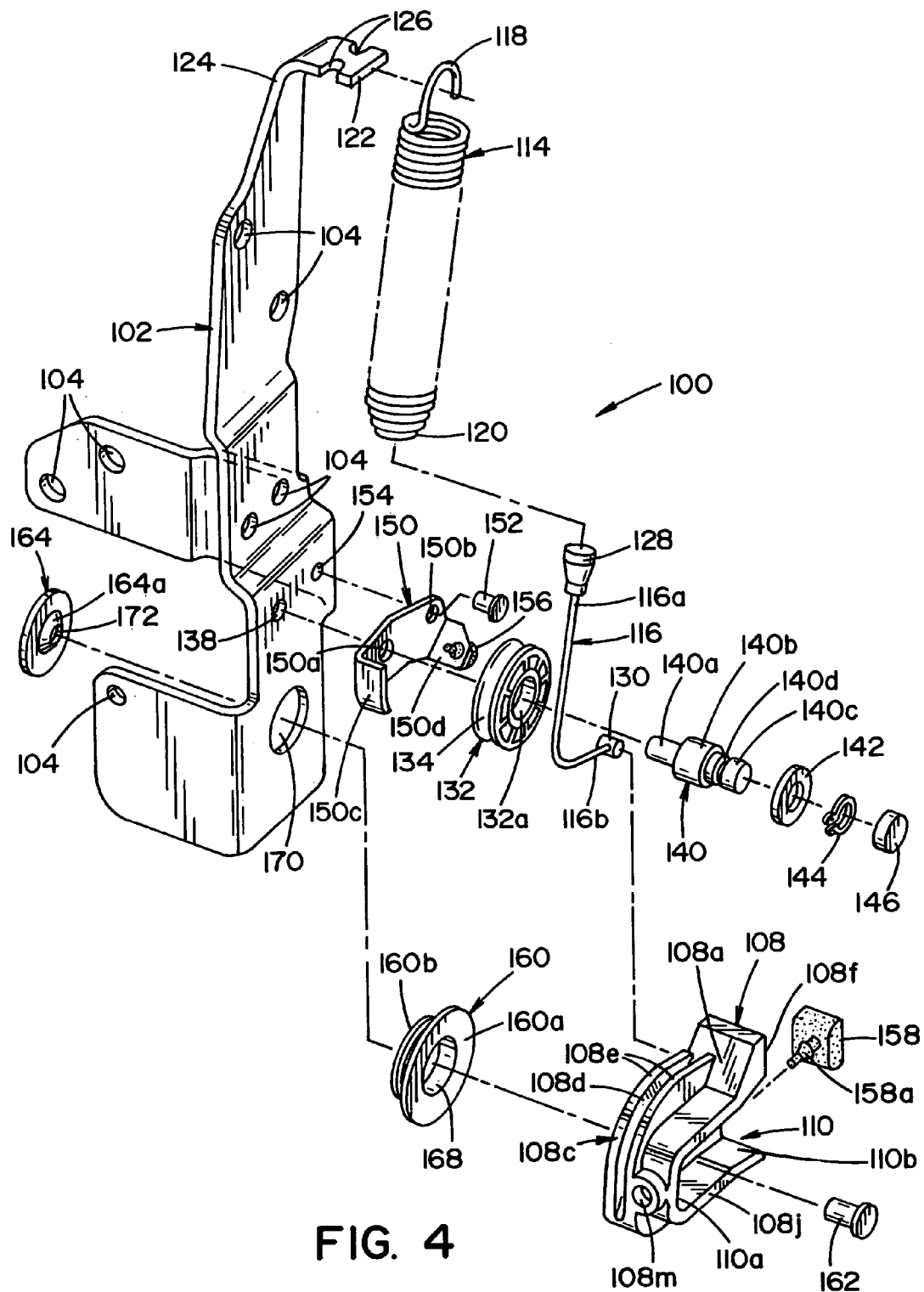
FIG. 4 is an exploded perspective view of the tailgate lift-assist assembly of FIG. 3.

With continued reference to FIG. 2, a tailgate lift-assist assembly 100 is provided for assisting in closing the tailgate and countering the weight of the tailgate when opened toward the flip-down position. As will be described in more detail below, the lift-assist assembly 100 is mounted to the tailgate 10 adjacent the second hinge/lock assembly 50. Specifically, with additional reference to FIGS. 3 and 4, the tailgate lift-assist assembly 100 includes a base plate or bracket 102 having apertures 104 through which suitable fasteners, such as bolts 106 (FIG. 5), are received for mounting the assembly 100 to the tailgate.

The lift-assist assembly 100, also referred to herein as a load-assisting assembly, includes a stationary member or pin receiver 108 rotatably or pivotally connected to the bracket 102. Since the bracket 102 is fixedly connected to the tailgate 10 and the stationary member 108 rotatably connected to the bracket, the stationary member 108 is rotatably connected to the tailgate 10. The stationary member 108 includes a recess 110 that receives a striker pin 112 (FIGS. 5 and 15) when the tailgate 10 is in the closed position. As will be described in more detail below, the striker pin 112 is fixedly mounted to the vehicle V and, more particularly, to the flange 56 of the load-carrying bed 12 and, when the striker pin 112 is received in the stationary member recess 110, the stationary member 108 is nonrotatably connected to the vehicle V. The stationary member 108 is, however, selectively detachable from the vehicle V which allows the tailgate to open to the swing-open position.

The lift-assist assembly 100 additionally includes a spring 114 and a cable 116 that together extend between the stationary member 108 and a location on the bracket 102 spaced from the stationary member. More particularly, the spring 114 has a first spring end 118 and a second spring end 120. The spring 114 is attached to the tailgate 10 and, more specifically, the bracket 102 at the first spring end 118. More particularly, the first spring end 118 is a hooked portion that attaches to a flange 122 extending from a top end 124 of the bracket 102. The flange 122 includes recesses 126 for retaining the hooked portion 118 of the spring 114.

The cable 116 includes a cable first end 116*a* and a cable second end 116*b*. The cable 116 is attached to the spring 114 at the cable first end 116*a* and is attached to the stationary member 108 at the cable second end 116*b*. More particularly, the cable first end 116*a* includes a frustoconical member 128 around which the spring second end 120 is coiled to securely connect the spring 114 to the cable 116. The cable second end 116*b* includes a cylindrical member 130 that attaches to the stationary member 108, as will be described in more detail below.

The cable 116 passes over a pulley 132 rotatably mounted to the bracket 102, which is fixedly mounted to the tailgate 10. As will be described in more detail below, the positioning of the pulley 132 relative to the spring 114 and the stationary member 108 allows the pulley to apply a gradually increasing tension on the spring 114 when the tailgate 10 is moved toward the flip-down position. In the illustrated embodiment, only a single pulley 132 is disposed along the cable 116 and the single pulley 132 is rotatably connected to the tailgate 10 via the bracket 102. The pulley 132 is mounted to the bracket 102 to prevent transverse movement thereof relative to the tailgate 10.

Figure 10:
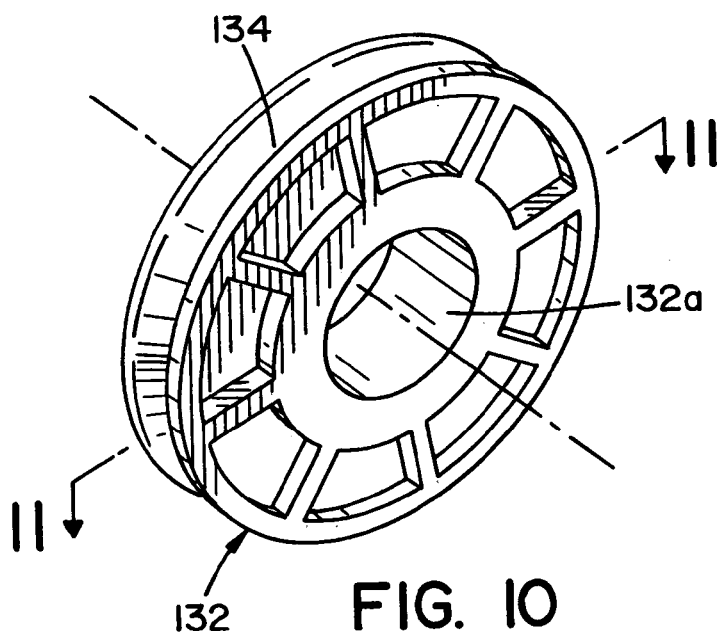
FIG. 10 is a perspective view of a pulley of the tailgate lift-assist assembly of FIG. 3.
Figure 11:
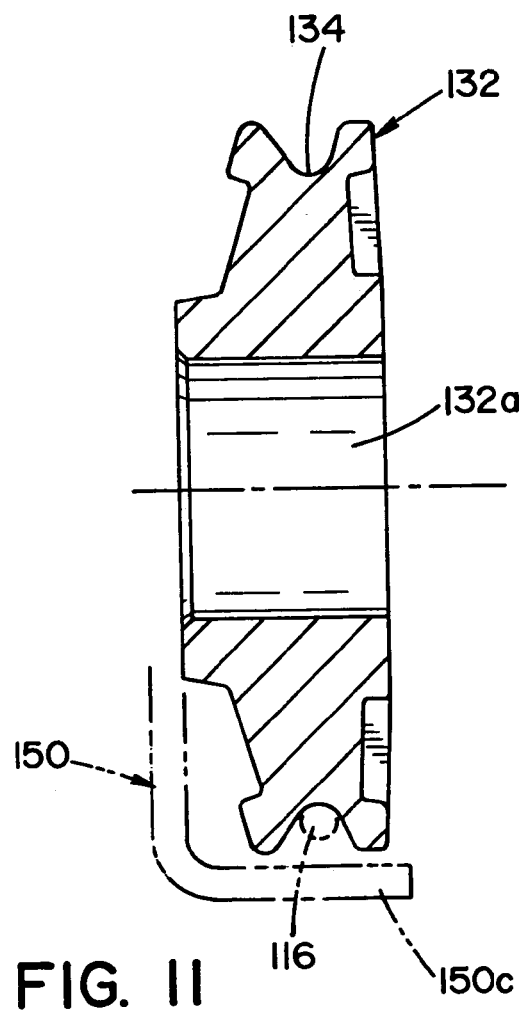
FIG. 11 is a cross-sectional view of the pulley taken along the line 11—11 of FIG. 10.

With additional reference to FIGS. 10 and 11, the pulley 132 includes a center aperture 132*a* for rotatably mounting the pulley to the bracket 102 The pulley 132 defines a circumferential groove 134 for receiving and guiding the cable 116. In the illustrated embodiment, a pin member 140 is received through the pulley aperture 132*a* and an aperture 138 in the bracket 102 to rotatably mount the pulley 132 to the bracket 102. More particularly, the pin member 140 includes a portion 140*a* that is secured in the aperture 138 and to the bracket 102 by riveting. A diametrically enlarged portion 140*b* receives the pulley 132 annularly thereabout and a shaft portion 140*c* receives a washer 142 and a retaining ring, such as circlip 144 in a groove 140*d* defined circumferentially around the portion 140*c*. Cap 146 is optionally received over the distal end of the shaft portion 140*c*.

A guard bracket or member 150 is nonrotatably mounted to the bracket 102 by the pin member 140 and rivet 152. More particularly, portion 140*a* of the pin member 140 is received through a fist opening 150*a* defined in the bracket 150 and the rivet 152 is received through a second opening 150*b* defined in the bracket 150 and through an aperture 154 defined in the bracket 102. In the illustrated embodiment, the guard bracket 150 at least partially surrounds the pulley 132. More particularly, the guard bracket 150 includes a flange portion 150*c* positioned adjacent a portion of the pulley 132 over which the cable 116 passes (i.e., is received in the groove 134). In one embodiment, the flange portion 150*c* is positioned relative to the pulley 132 so that a gap formed therebetween is smaller than a diameter of the cable 116 which maintains the cable in the groove 134 of the pulley. The bracket 150 further includes a stopper flange portion 150*d* having a stopper 156 mounted thereto. The stopper 156 limits movement of the bracket 102 and, thereby, the tailgate 10 relative to the stationary member 108 when the tailgate is moved to or toward the closed position. The stopper 156 prevents the tailgate 10 from moving past the closed position when the tailgate is moved in the direction corresponding with movement of the tailgate from the flip-down open position to the closed position. Specifically, the stopper 156 engages a stopper portion 108*a* of the stationary member 108.

Figure 12:
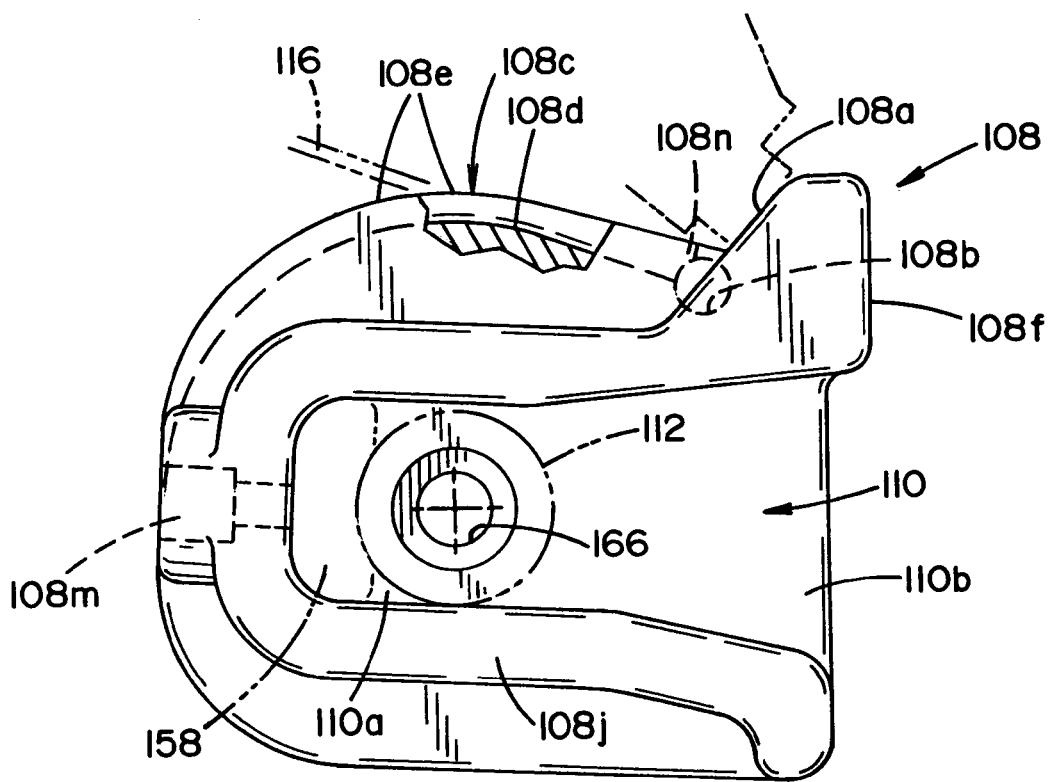
FIG. 12 is a side elevational view of a pin receiver of the tailgate lift-assist assembly of FIG. 3.
Figure 13:
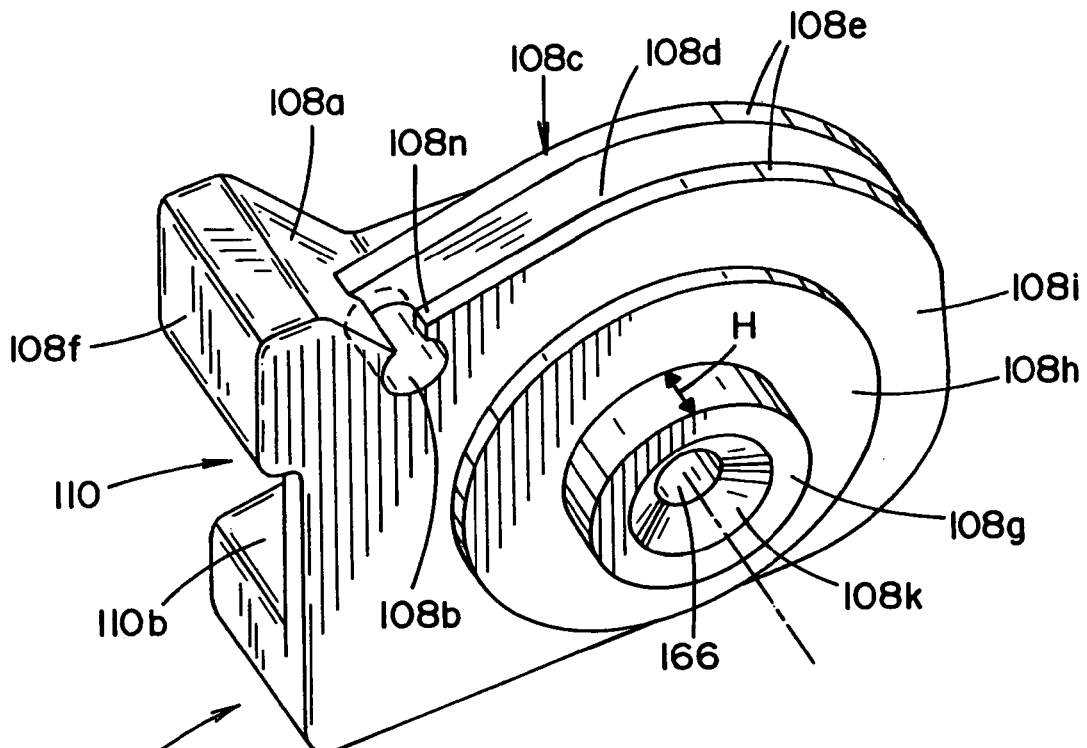
FIG. 13 is a rear perspective view of the pin receiver of FIG. 12.
Figure 14:
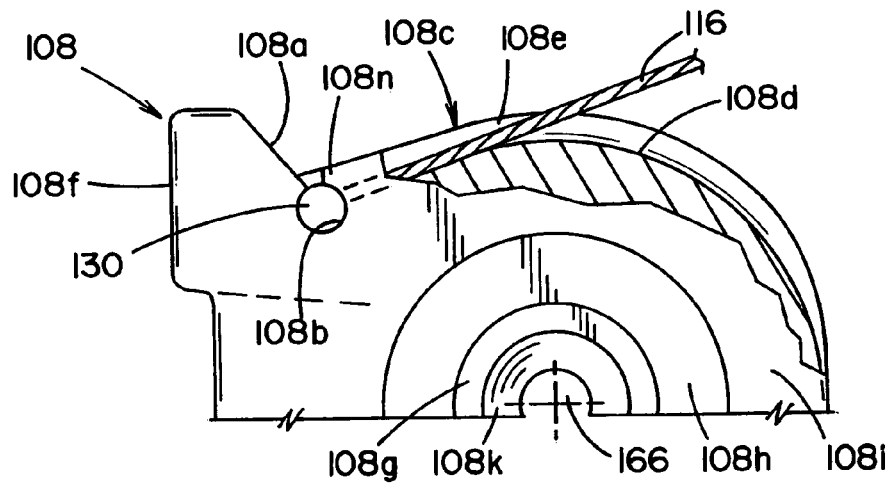
FIG. 14 is a partial side view of the pin receiver of FIG. 12 having one end of a cable secured thereto.

With additional reference to FIGS. 12–14, the stationary member recess 110 has an inner portion 110*a* and a mouth portion 110*b*. The mouth portion 110*b* is wider than the inner portion 110*a* so that the striker pin 112 is guided into the recess upon closure of the tailgate 10. A bumper 158 is preferably (but only optionally) provided within the recess 110 of the stationary member 108 for cushioning the striker pin 112 when received in the recess 110. The bumper 158 includes a protruding portion 158*a* that is received and retained within an aperture 108*m* defined in the stationary member 108.

The stationary member 108 includes an aperture or hole 108*b* appropriately sized for receiving the cylindrical member 130 when connecting the cable 116 to the stationary member. The hole 108*b* opens to a grooved area 108*c* including a cable receiving surface 108*d* and cable guiding ridges or surfaces 108*e*. When the cable 116 is connected to the stationary member 108, the cable rests on the surface 108*d* and is limited from moving off the surface 108*d* by the guiding ridges 108*e*. A lip or lip area 108*n* is provided between the hole 108*b* and the surface 108*d* for retaining the cylindrical member within the hole and thereby the connection between the cable 116 and the stationary member 108.

A switch surface 108*f* is defined adjacent one corner of the stationary member 108 for actuating an optionally provided electrical switch SW (FIGS. 5 and 15) when the tailgate 10 is moved to the closed position. As will be described in more detail below, the switch surface 108*f* is used to engage a button that electrically transmits a signal for indicating that the tailgate 10 is in the closed position to the driver and/or occupants of the vehicle V. The stationary member 108 additionally includes a center protuberarice 108*g* for rotatably connecting the stationary member 108 to the bracket 102. The protuberance 108*g* has a height H that provides for smooth rotation of the stationary member 108 relative to the bracket 102. Surrounding the center protuberance 108*g* is a bearing surface 108*h* that engages a bushing 160 when the stationary member 108 is rotatably mounted to the bracket 102. The bearing surface 108*h* is slightly elevated relative to the surface 108*i* surrounding the bearing surface. A raised ridge 108*j* defines the recess 110.

The stationary member 108 is rotatably mounted to the bracket 102 via a rivet 162 and a plate retainer 164. More specifically, the rivet 162 passes through a central opening or hole 166 (FIG. 13) defined in the stationary member 108, through an opening 168 in the bushing 160, through an opening 170 in the bracket 102 and through an opening 172 in the plate retainer 164. The bushing 160 is disposed between the stationary member 108 and the bracket 102. More particularly, the protuberance 108*g* is received in the hole 168 (i.e., the bushing 160 in annularly disposed on the protuberance). A flange portion 160*a* of the bushing abuts against the bushing surface 108*h* of the receiving member 108. An axial portion 160*b* is received in the opening 170. The bushing 160 and the bushing surface 108*h* enable smooth rotation of the bracket 102 relative to the stationary member 108. A frustoconical portion 164*a* of the plate retainer 164 is received in a mating portion 108*k* of the receiving member 108.

Figure 15:
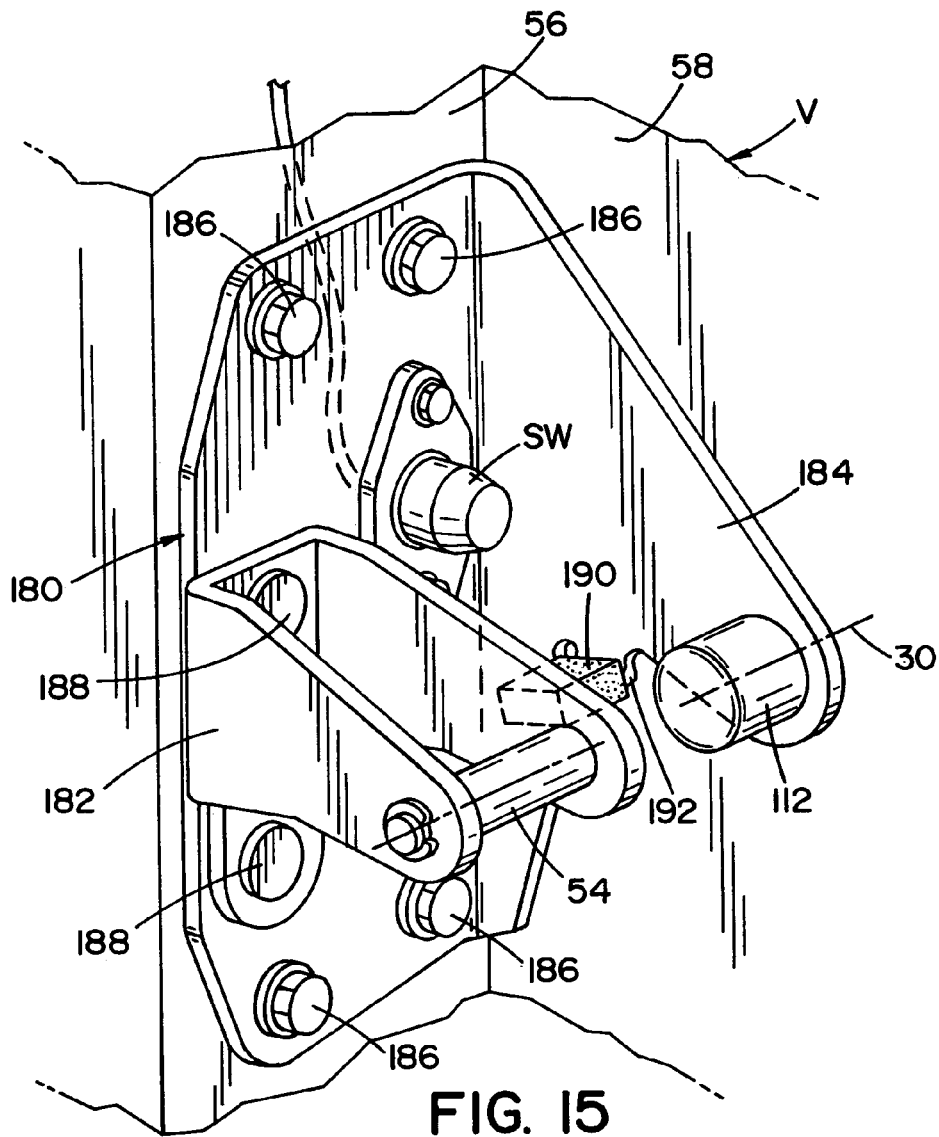
FIG. 15 is a partial perspective view of a striker pin mounted to the vehicle and selectively receivable within a recess of the pin receiver.

With reference to FIG. 15, the second hinge/lock striker 54 and the tailgate lift-assembly striker 112 are mounted to the vehicle V and, more particularly, to the flange 56 by bracket 180. Another bracket 182 mounts the striker 54 to the bracket 180. A flange portion 184 of the bracket 182 orients the striker 112 in a generally coaxial relation to the striker 54. The bracket 180 is secured to the vehicle V with suitable fasteners, such as bolts 186. The bracket 182 is secured to the bracket 180 with suitable fasteners, such as rivets 188.

The switch SW is mounted to the bracket 180 adjacent the flange 184. A rotation prevention bumper 190 is disposed on a flange portion 192 extending from the flange 184. The bumper 190 is positioned behind the striker 112 and limits rotation of the receiving member 108 as will be described in more detail below. The bumper 190 extends in a direction generally parallel to the axis of the striker 112.

Figure 5:
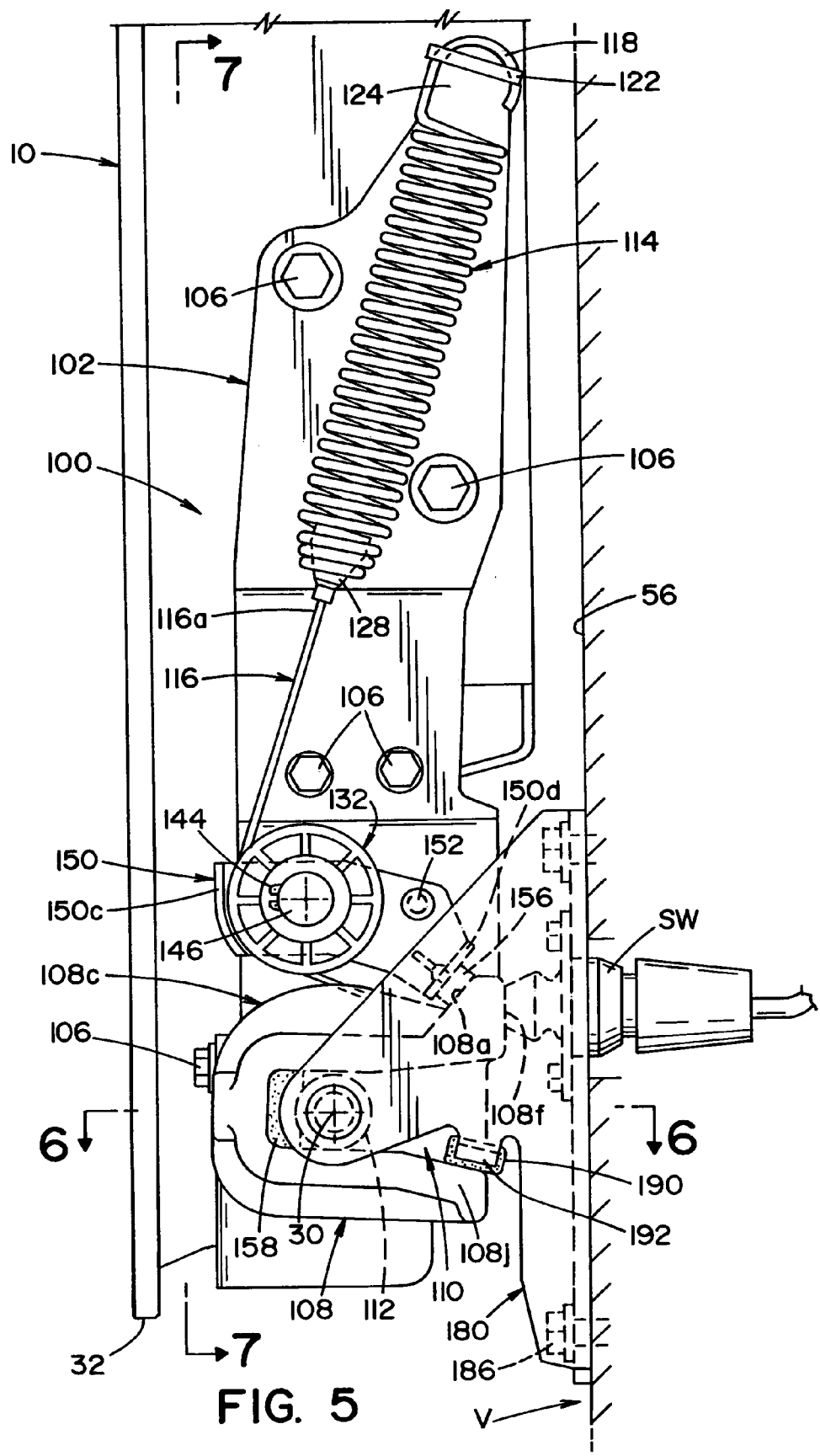
FIG. 5 is a partial side view of the vehicle and tailgate lift-assist assembly shown with the tailgate in a closed position.
Figure 6:
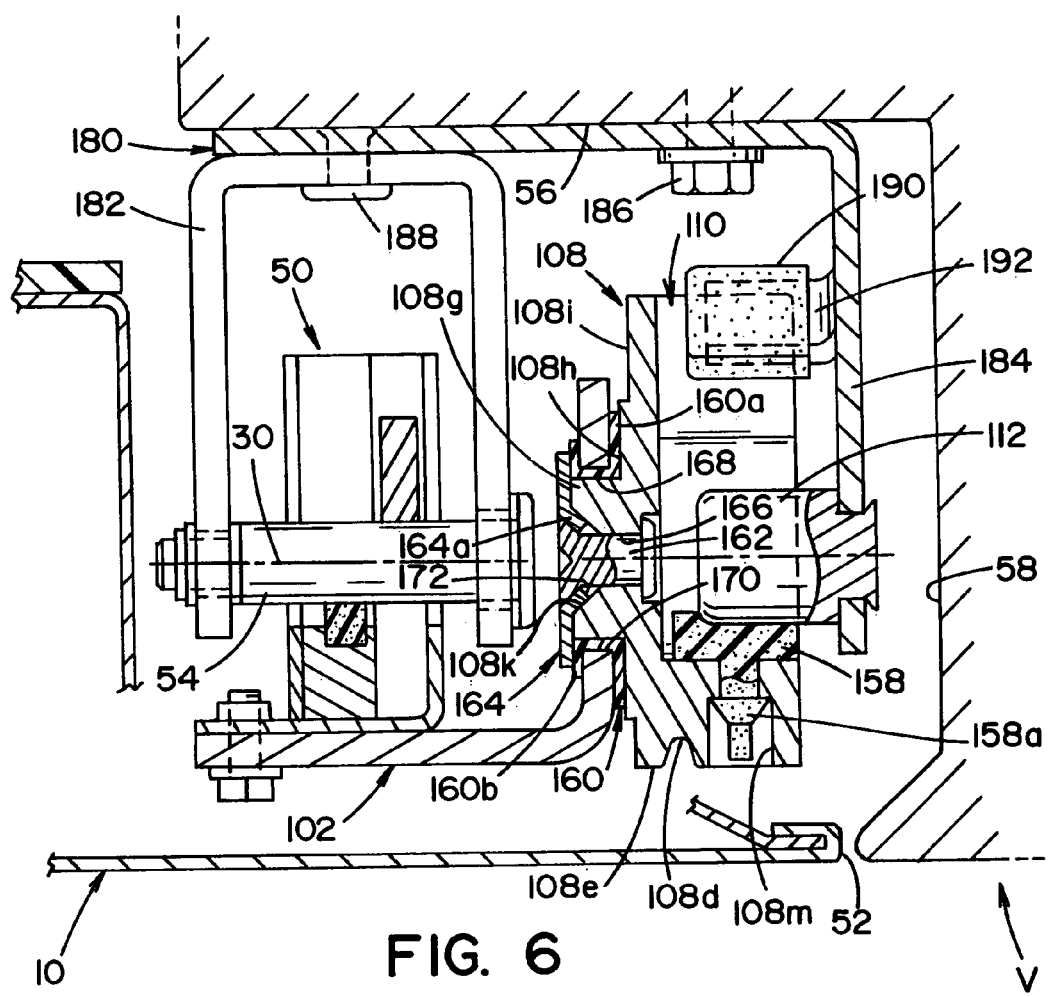
FIG. 6 is a cross-sectional view of the tailgate lift-assist assembly taken along the line 6—6 of FIG. 5.
Figure 7:
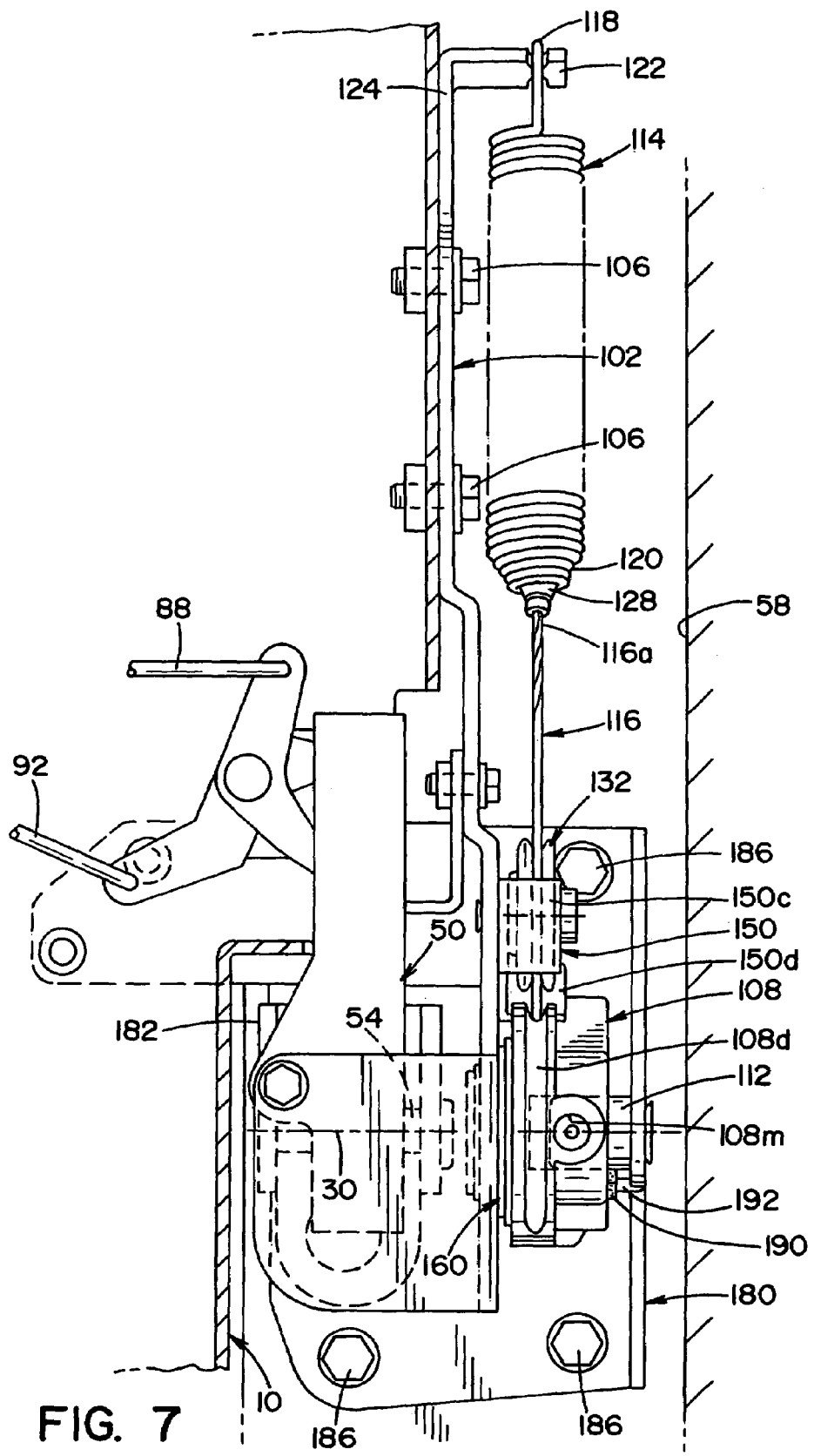
FIG. 7 is a cross-sectional view of the tailgate lift-assist assembly taken along the line 7—7 of FIG. 5.

With reference to FIGS. 5–7, the tailgate lift-assist assembly 100 is generally shown in a position and/or orientation that it would be in with the bracket 102 attached to the tailgate 10 when the tailgate is in the closed position. More particularly, when the tailgate 10 is in the closed position, the striker pin 112 is received in the recess 110 of the stationary member 108 against the bumper 158. The bumper 190 engages a portion of the ridge 108*j* of the receiving member 108 and prevents rotation of the receiving member in at least a first direction (counterclockwise in FIG. 5). The sandwiching of the surfaces 108*a*,108*f* between the stopper 156 and the switch SW further prevents rotation of the receiving member in the first direction and also prevents rotation in a second direction (clockwise in FIG. 5). Thus, the stationary member 108 is nonrotatably connected to the vehicle V. The stopper 156 additionally serves to limit further movement of the tailgate beyond the closed position.

As shown, the switch surface 108*f* engages and depresses the optional switch SW. In one embodiment, the switch SW is used to relay a signal to a dashboard indicator (not shown) of the vehicle V that the tailgate 10 is closed and/or open. The dashboard indicator can be a conventional light icon that illuminates somewhere on the dashboard to indicate to a driver and/or occupants of the vehicle V the position of the tailgate 10.

The positioning of the spring 114 and the cable 116, along with the pulley 132 over which the cable is carried, causes an initial tension to be applied to the spring 114 (illustrated in FIG. 5). With the initial tension applied, the spring 114 urges the tailgate toward, or maintains the tailgate in, the closed position. The force exerted by the spring 114 onto the tailgate urging the tailgate toward the closed position requires a relatively large amount of torque to overcome. Thus, when desirable to move the tailgate 10 to the fold-open position (shown in FIG. 8), a sufficient force must be applied to the tailgate 10. The relatively large amount of torque and the sufficient force are easily generated by a user applying an opening force to the tailgate which, in combination with the weight of the tailgate, overcomes the urging of the spring 114.

Figure 8:
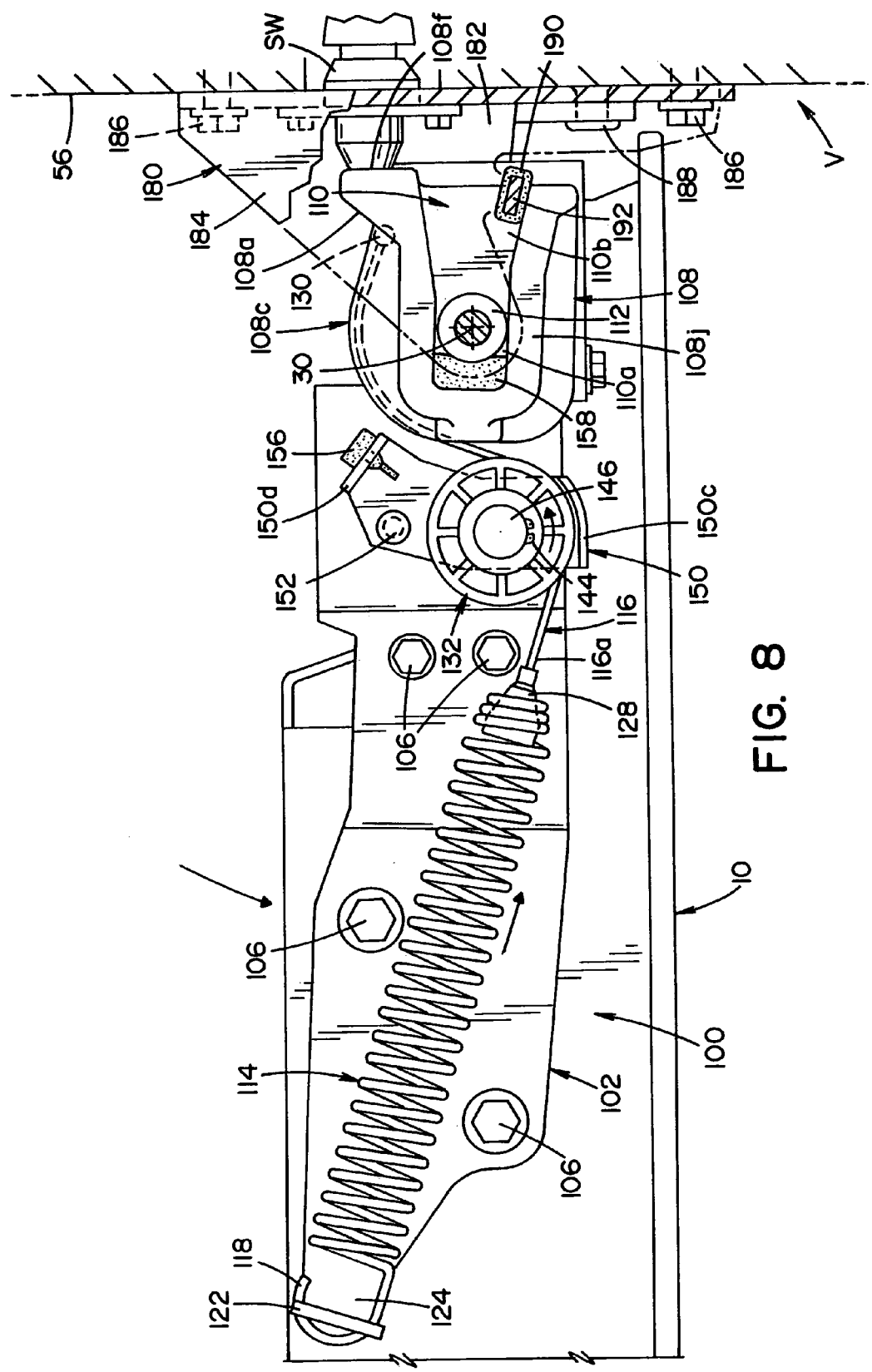
FIG. 8 is a partial side view of the vehicle and tailgate lift-assist assembly shown with the tailgate in a flip-down position.

As the tailgate 10 and lift-assist assembly 100 are moved to the flip-down position shown in FIG. 8, the pulley 132 forces the cable 116 around the stationary member 108 and increasingly applies a further tension to the spring 114. More particularly, the bracket 102, to which the pulley 132 and one end 118 of the spring 114 are connected, is pivotally movable relative to the stationary member 108 when the tailgate is moved between the closed position and the flip-open position. The stationary member 108 is held and prevented from rotating with the tailgate 10 by the bumper 190. When the tailgate is opened, the spring 114 and the pulley 132 pivotally move relative to the stationary member 108 and the spring 114 is pulled on through the cable 116. The further the tailgate 10 is moved from the closed position toward the flip-open position, the greater the tension applied to the spring 114. The greater the tension, the greater the force (a closing force) the spring 114 applies in urging the tailgate 10 toward the closed position (or at least resisting movement of the tailgate 10 toward the flip-open position) and the larger the amount of torque necessary to overcome the tension or force of the spring 114.

The increasing force applied by the spring 114 as the tailgate 10 is opened toward the flip-open position limits the tailgate from immediately falling to the flip-open position upon unlatched of the locking assemblies 44,50. Thus, the weight of the tailgate is increasingly resisted by the spring 114 as the tailgate 10 approaches the flip-open position. This allows a user to gently open the tailgate to the flip-open position and reduces the amount of force a user must apply to prevent the tailgate 10 from falling or slamming into the flip-open position. The increasing force applied by the spring 114 as the spring is further tensioned, also referred to herein as gradient loading of the spring, also assists the user when the tailgate 10 is moved from the flip-open position to the closed position.

More particularly, the force exerted by the spring 114 enables the user to move the tailgate 10 from the flip-open position to the closed position with relative ease. The loaded spring 114 resists or counters the weight of the tailgate 10. In the illustrated embodiment, the positioning of the spring 114, cable 116, pulley 132 and/or stationary member 108 relative to one another provides at least about a twenty percent (20%) mechanical advantage to the user in closing the tailgate from the flip-down position and/or resisting the tailgate from falling to the flip-down position from any position between the closed position and the flip-down position. Thus, a user of the tailgate 10 is able to move the tailgate from the flip-open position to the closed position with relative ease.

Figure 9:
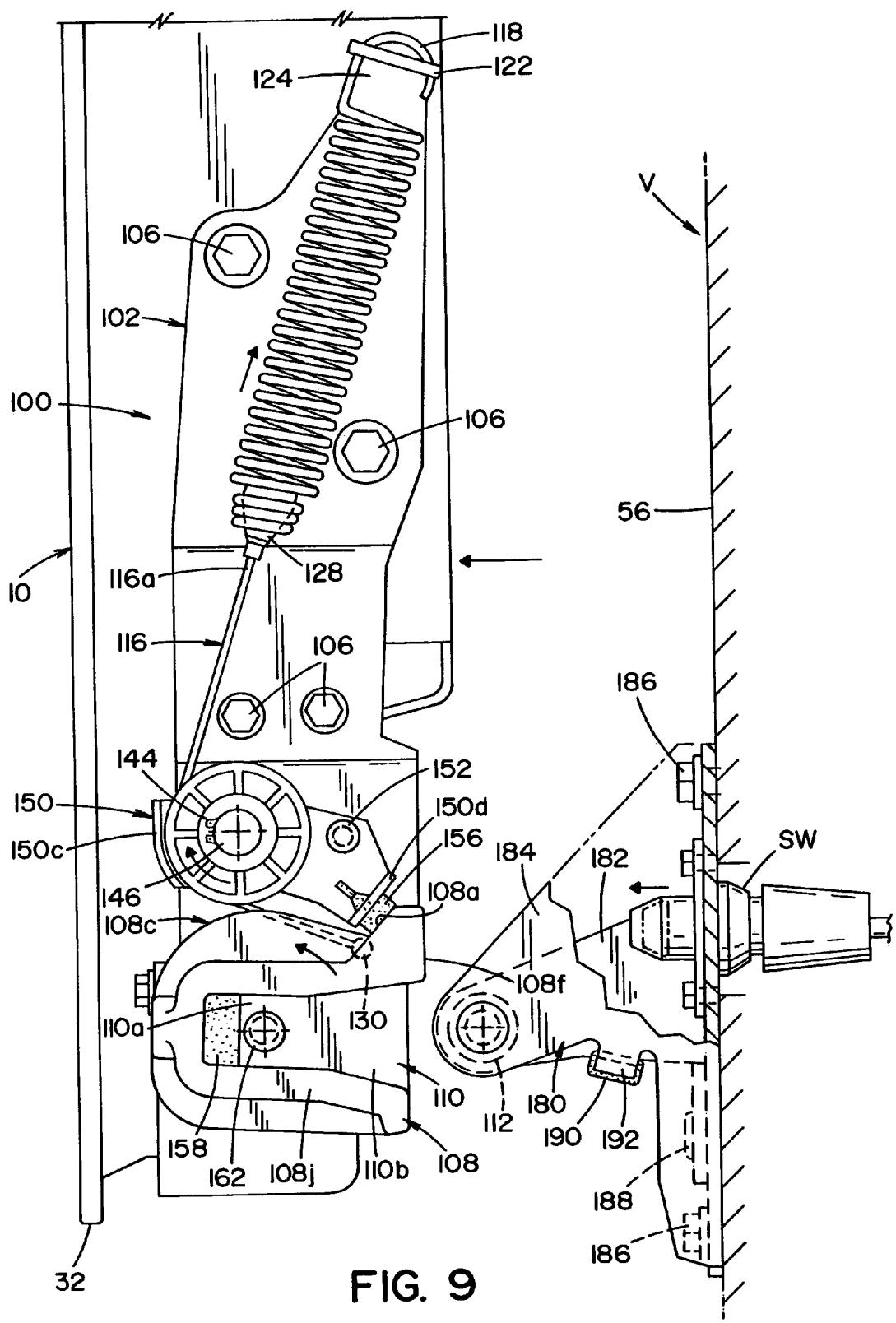
FIG. 9 is a partial side view of the vehicle and tailgate lift-assist assembly shown with tailgate between a swing-open position and the closed position.

With reference to FIG. 9, when the locking assembly 44 is unlocked from the striker 54, the tailgate 10 is movable from the closed position to or toward the swing-open position. When the tailgate 10 is opened toward the swing-open position, the stationary member 108 is moved away from the striker pin 112 and the striker pin is removed from the recess 110. The tailgate lift-assist assembly 100 remains in its initial position relative to the tailgate 10. When employed, the switch SW is released and able to communicate the status of the tailgate (i.e., opening toward the swing-open position). Upon closure of the tailgate 10, the striker 112 is again received in the stationary member recess 110 to again nonrotatably connect the stationary member 108 to the vehicle V. Thus, the releasable connection between the lift-assembly 100 and the vehicle V (specifically, between the stationary member 108 and the striker pin 112) assists in movement of the tailgate relative to the vehicle while permitting the tailgate and lift-assist assembly to disconnect and separate from the vehicle V.

In the illustrated embodiment, the lift-assist assembly 100 has been described for use in assisting with movement of a first body, the tailgate 10, relative to a second body, the vehicle V. However, it is to be appreciated by those skilled in the art that the lift-assist assembly 100 could be alternately employed in any number of other applications for assisting with movement of a first body relative to a second body and the bodies need not be a tailgate and a vehicle V.

The exemplary embodiment has been described with reference to the embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A tailgate lift-assist assembly for a tailgate mounted to a vehicle body, the tailgate movable between a closed position and an open position, said tailgate lift-assist assembly comprising:
   a spring having a first spring end and a second spring end, said spring attached to the tailgate at said first spring end;
   a stationary member rotatably connected to the tailgate and nonrotatably connected to the vehicle body; and
   a cable having a first cable end and a second cable end, said cable attached to said spring second end at said first cable end and attached to said stationary member at a cable second end, said cable passing over a pulley rotatably mounted to the tailgate and applying a tension on said spring when the tailgate is moved toward said open position.

2. The tailgate lift-assist assembly of claim 1 wherein said stationary member is selectively detachable from the vehicle body.

3. The tailgate lift-assist assembly of claim 2 wherein the open position is a fold-down open position and the stationary member is selectively detachable from the vehicle body when the tailgate is alternatively opened toward a swing-open position.

4. The tailgate lift-assist assembly of claim 1 wherein said stationary member is a pin receiver defining a recess for receiving a striker pin of the vehicle body.

5. The tailgate lift-assist assembly of claim 4 wherein said stationary member is nonrotatably connected to the vehicle body when the striker pin is received in said recess.

6. The tailgate lift-assist assembly of claim 1 wherein at least one of said spring and said pulley pivotally move relative to said stationary member when said tailgate is moved between said closed position and said open position.

7. The tailgate lift-assist assembly of claim 1 further including;
   a bracket fixedly mounted to the tailgate, said spring first end attached to said bracket and said bracket pivotally movable relative to said stationary member when said tailgate is moved between said closed position and said open position.

8. The tailgate lift-assist assembly of claim 7 wherein said pulley is rotatably connected to said bracket.

9. The tailgate lift-assist assembly of claim 8 wherein a guard member is disposed about said pulley and attached to said bracket.

10. The tailgate lift-assist assembly of claim 1 wherein a stopper is provided on at least one of said tailgate and said stationary member to limit movement of the tailgate when moved toward the closed position.

11. The tailgate lift-assist assembly of claim 10 wherein said stopper prevents the tailgate from moving past a closed position when the tailgate is moved in a direction corresponding with movement of the tailgate from the open position to the closed position.

12. The tailgate lift-assist assembly of claim 1 wherein the tailgate is a dual-mode tailgate and said open position is a fold-down position, said stationary member connected to the vehicle body when the tailgate is in the closed position and the tailgate is moved between the closed position and the fold-down position, said stationary member removable from said vehicle body when the tailgate is moved between the closed position and a swing-open position.

13. The tailgate lift-assist assembly of claim 1 wherein said pulley is rotatably connected to the tailgate and prevented from transverse movement relative to said tailgate.

14. The tailgate lift-assist assembly of claim 1 wherein the positioning of at least one of said spring, said cable, said pulley and said stationary member relative to at least another of said spring, said cable, said pulley and said stationary member provides at least about a twenty percent (20%) mechanical advantage in moving said tailgate from said open position to said closed position.

15. The tailgate lift-assist assembly of claim 1 wherein only a single pulley is used along said cable.

16. The tailgate lift-assist assembly of claim 1 wherein said spring requires a large amount of torque to overcome said tension.

17. The tailgate lift-assist assembly of claim 1 wherein said positioning of said cable and said spring applies an initial tension on said spring that requires a large amount of torque to overcome.

18. A load-assisting assembly, comprising:
a spring having a first spring end attached to an associated tailgate;
a stationary member rotatably connected to said associated tailgate and nonrotatably connected to an associated vehicle body onto which the tailgate is mounted;
a cable having a first cable end attached to a second spring end of said spring and a second cable end attached to said stationary member; and
a pulley rotatably mounted to said associated tailgate and carrying said cable, said cable applying a tension to said spring when said associated tailgate is moved relative to said associated body and said pulley increasing the amount of said tension when said tailgate is moved.

19. The load-assisting assembly of claim 18 wherein said stationary member is selectively detachable from said associated vehicle body.

20. A load-assisting assembly for assisting with movement of a first body relative to a second body, said load-assisting assembly comprising:
a spring having a spring first end connected to the first body;
a stationary member rotatably connected to the first body and nonrotatably connected to the second body;
a cable having a first cable end connected to a spring second end of said spring and a second cable end connected to the stationary member, said cable passing over a pulley rotatably mounted to the first body and applying a tension to said spring when the first body is moved in a first direction relative to the second body for assisting in movement of the first body in a second, opposite direction relative to the second body.

21. The load-assisting assembly of claim 20 wherein the first body is a tailgate and the second body is a vehicle body to which the tailgate is mounted.

22. The load-assisting assembly of claim 20 wherein the stationary member is selectively detachable from the second body.

23. A tailgate lift-assist assembly, comprising:
a stationary member rotatably connected to a tailgate that is mounted to a vehicle body;
a cable having a first cable end connected to the tailgate and a second cable end connected to said stationary member; and
a spring disposed one of along said cable, adjacent said first cable end and adjacent said second cable end, said spring tensioned when the tailgate is moved from a closed position toward an open position and thereby applying a closing force to the tailgate through said cable when the tailgate is moved between said closed position and said open position.

24. The tailgate lift-assist assembly of claim 23 further including:
a pulley over which said cable passes for assisting in tensioning said spring when said tailgate is moved from said closed position toward said open position.

25. The tailgate lift-assist assembly of claim 23 wherein said stationary member is selectively detachable from the vehicle body.

26. A tailgate lift-assist assembly, comprising:
a spring having a first spring end attached to a tailgate and a second spring end;
a cable having a first cable end connected to said second spring end and a second cable end removably connected to a vehicle body to which the tailgate is mounted, said spring tensioned when said tailgate is moved from a closed position toward an open position to thereby apply a closing force to said tailgate through said cable when the tailgate is moved between said closed position and said open position.

27. The tailgate lift-assist assembly of claim 26 further including:
a pulley over which said cable passes for assisting in tensioning said spring when said tailgate is moved from said closed position toward said open position.

28. The tailgate lift-assist assembly of claim 26 further including:
a stationary member rotatably connected to said tailgate and having said cable second end connected thereto, said stationary member nonrotatably and removably connected to said vehicle body.

* * * * *